US008506890B2

(12) United States Patent
Kanda et al.

(10) Patent No.: US 8,506,890 B2
(45) Date of Patent: Aug. 13, 2013

(54) METHOD FOR PURIFICATION OF SILICA PARTICLES, PURIFIER, AND PURIFIED SILICA PARTICLES

(75) Inventors: Minoru Kanda, Akita (JP); Yoshiyuki Tsuji, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 19 days.

(21) Appl. No.: 13/047,433

(22) Filed: Mar. 14, 2011

(65) Prior Publication Data

US 2011/0165028 A1 Jul. 7, 2011

Related U.S. Application Data

(62) Division of application No. 11/995,694, filed as application No. PCT/JP2006/322029 on Oct. 25, 2006, now Pat. No. 7,935,326.

(30) Foreign Application Priority Data

Oct. 28, 2005 (JP) ................................. 2005-313795

(51) Int. Cl.
*B01J 8/24* (2006.01)
*B01J 19/08* (2006.01)

(52) U.S. Cl.
USPC ....................... 422/139; 422/146; 422/186.01

(58) Field of Classification Search
USPC ...................... 422/139, 146, 186.01
See application file for complete search history.

(56) References Cited

U.S. PATENT DOCUMENTS

| | | | | |
|---|---|---|---|---|
| 4,115,927 | A * | 9/1978 | Rosensweig | 34/249 |
| 4,338,169 | A * | 7/1982 | Bienvenu | 75/10.67 |
| 4,780,113 | A * | 10/1988 | Koslow | 95/27 |
| 4,956,059 | A | 9/1990 | Englisch et al. | |
| 6,746,655 | B1 | 6/2004 | Becker et al. | |

FOREIGN PATENT DOCUMENTS

| | | |
|---|---|---|
| JP | 6-40713 | 2/1994 |
| JP | 7-14822 | 2/1995 |
| JP | 8-290911 | 11/1996 |
| JP | 2001-261352 | 9/2001 |
| JP | 2001 328807 | 11/2001 |
| JP | 2002-544102 | 12/2002 |
| JP | 2003-119018 | 4/2003 |
| JP | 2004-307222 | 11/2004 |
| JP | 2005 231983 | 9/2005 |
| RU | 2017 690 C1 | 8/1994 |
| RU | 2198138 C2 | 12/2003 |
| RU | 2220117 C1 | 12/2003 |

* cited by examiner

*Primary Examiner* — Jennifer A Leung
(74) *Attorney, Agent, or Firm* — Oblon, Spivak, McClelland, Maier & Neustadt, L.L.P.

(57) ABSTRACT

To provide a treatment method having excellent purification effect, in which impurities having high ionicity in a silica powder can be removed in a short time, an apparatus thereof, and a purified silica powder. A purification method of a silica powder comprises making a silica powder into a fluid state; contacting a purified gas to the silica powder in the fluid state at high temperature; and thereby removing impurity components of the silica powder. In the method, the silica powder in the fluid state is positioned in a magnetic field region. Further, the silica powder is contacted with the purified gas, while applying voltage to the silica powder by an electric field generated by moving of the silica powder. Preferably, the silica powder in a fluid state is positioned in the magnetic region of 10 gausses or more, and contacted with the purification gas at a temperature of 1000° C. or more.

5 Claims, 1 Drawing Sheet

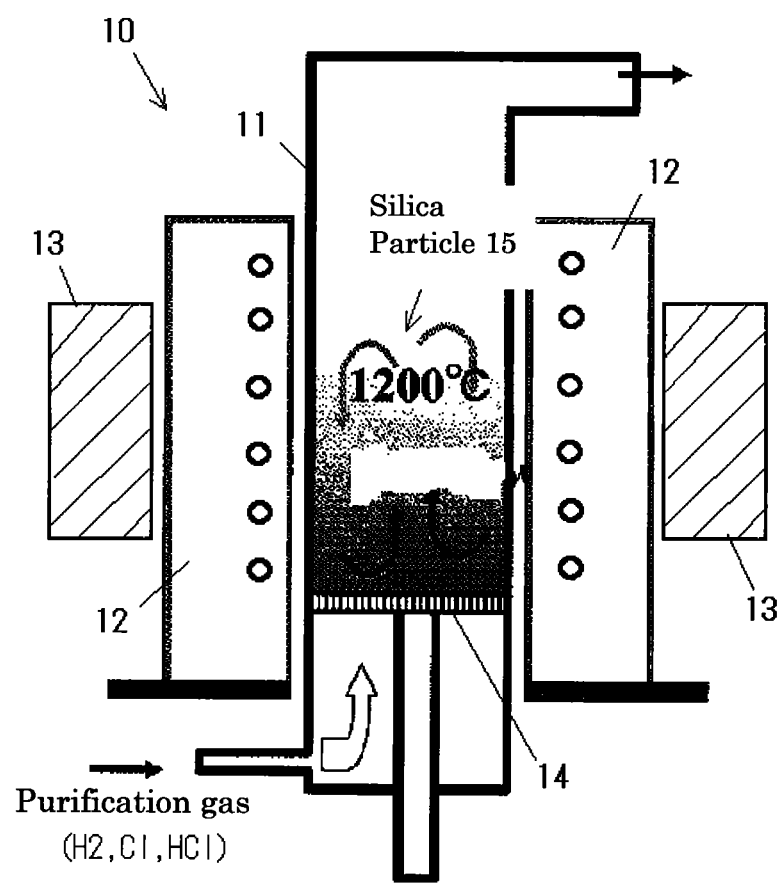

METHOD FOR PURIFICATION OF SILICA PARTICLES, PURIFIER, AND PURIFIED SILICA PARTICLES

This application is a division of U.S. application Ser. No. 11/995,694 filed on Jan. 15, 2008, now U.S. Pat. No. 7,935,326, which is a 371 of PCT/JP2006/322029 filed on Oct. 25, 2006, which claims priority benefit from Japanese Application No. 2005-313795 filed on Oct. 28, 2005.

FIELD OF THE INVENTION

The present invention relates to a purification method of a silica powder, a purification apparatus thereof, and a purified silica powder.

DESCRIPTION OF THE BACKGROUND ART

A silica powder has been used as a raw material of a filler for a plastic package, such as IC, LSI and the like, or for a raw material powder of a quartz glass crucible for pulling up a silicon single crystal of a semiconductor material. If impurities are contained in these silica powders, a semiconductor product is bad influenced so that the purified silica powder having few impurities is required.

As for a purification method of the silica powder, for example, Japanese Patent Application Laid Open No. 06-40713 discloses a method including: introducing gas containing chlorine or a chlorine compound into a silica powder at a temperature of 1000 to 1500° C. so as to fluidize the silica powder; and dehydrating the fluidized silica powder. Further, Japanese Patent Application Laid Open No. 08-290911 discloses a method including: continuously supplying a quarts powder to a rotary kiln; introducing a mixed gas of hydrogen chloride and chlorine into the kiln so as to contact to the quarts powder; and chloridizing an alkali metal contained in the quarts powders so as to be volatilized and removed. Furthermore, Japanese translation of PCT international application No. 2002-544102 discloses a method including: fluidizing a silica powder by chlorine containing treatment gas so as to remove metal impurities.

On the other hand, Japanese Patent Kokoku No. 07-14822 discloses an electrolytic purification method including: applying DC high voltage to a solid quartz glass so as to move alkali metals or the like in the glass on the cathode side; and purifying the quartz glass. Further, Japanese Patent Application Laid Open No. 2004-307222 discloses an example in which an electrolytic purification is applied to a quartz glass crucible. Furthermore, Japanese Patent Application Laid Open No. 2003-119018 discloses a purification method of a quarts powder including: applying high voltage to a quartz powder so as to charge impurity particles adsorbed on the quartz powder; and electrostatic-separating the quartz powder.

In the conventional methods for fluidizing a silica powder by a purification gas so as to remove impurities, chlorine gas is used as the purification gas in many methods, and gas added with hydrogen is also used in many methods. However, although the method using hydrogen gas can purify for a short time, there are problems that controlling of gas concentration is difficult since hydrogen gas has dangerous of an explosive reaction, and handling of the hydrogen gas is also difficult. Further, it is necessary to set the treatment temperature high such as about 1300° C. or more in order to increase a reaction rate.

On the other hand, although the method using chlorine gas or hydrogen chloride gas as the purification gas has high effect for removing impurities, it needs a long time for the purification. In addition, in order to carry out the purification within a practical time, the purification temperature must be set a high temperature of 1250° C. or more so as to obtain high purification efficiency. Thus, there is a problem in productivity. Further, the conventional electrolytic purification method also needs long treatment time.

SUMMARY OF THE INVENTION

The present invention solves the above-described problems in the conventional purification method of a silica powder, and an objective of the present invention is to provide a treatment method having excellent purification effect, which enables to remove high ionic impurities in a silica powder for a short time, and a purification apparatus and a purified silica powder.

The present invention relates to a purification method of a silica powder, a purification apparatus, and a purified silica powder having the following constitutions.

(1) A purification method of a silica powder comprising: making a silica powder into a fluidizing state; contacting a purified gas to the silica powder in the fluidizing state at high temperature; and removing impurity components in the silica powder, where silica powder in the fluidizing state is positioned in a magnetic field region and contacted with the purified gas while applying voltage to the silica powder by an electric field which is generated by moving the silica powder.

(2) The purification method of a silica powder according to the above-described (1), where the silica powder in the fluidizing state is positioned in a magnetic field region of 10 gausses or more, and contacted with the purified gas at a temperature of 1000° C. or more.

(3) The purification method of the silica powder according to the above-described (1) or (2), where the purified gas contains any one or both of a halogen gas and a hydrogen halide gas.

(4) The purification method of a silica powder according to any one of the above-described (1) to (3), where the purification temperature is from 1000° C. or more to 1300° C. or less.

(5) A purification apparatus of the silica powder comprising: a fluidized bed for fluidizing the silica powder or a reaction container for receiving the fluidized silica powder; a means for introducing a purified gas into a fluidized bed or a reaction container; a means for heating in the fluidized bed or the reaction container at from 1000° C. to 1300° C.; and a means for forming a magnetic field of 10 gausses or more in the fluidized bed or the reaction container.

(6) A purification apparatus of the silica powder according to the above-described (5), where the fluidized bed possesses a function of the reaction container, a lower part of the vertical and cylindrical type fluidized bed is divided by a floor plate having many air hole, the silica powder is filled on the upper side of the floor plate, a purification gas in-let port is provided at the lower side of the floor plate, and a gas out-let port is provided on the upper side of the fluidized bed;

wherein a heater is provided on an outer periphery of the fluidized bed and the means for forming the magnetic field is provided on an outside of the heater;

wherein the silica powder in the fluidized bed is made to be fluidizing state by the purification gas introduced from the lower part of the fluidized bed;

wherein an inside of the fluidized bed is heated from 1000° C. or more to 1300° C. or less; and wherein the magnetic field is formed 10 Gauss or more by the means for forming the magnetic field.

(7) A purified silica powder, wherein impurity components are removed by the purification method according to any of the above-described (1) to (4).

According to the purification method of the present invention, the silica powder in a fluid state is positioned within the magnetic field region in 10 gausses or more at a temperature of 1000° C. or more so as to be applied a voltage in an electric field generated by moving the silica powder, and contacted with the purification gas. Thus, ionic impurity components contained in the silica powder are induced by the electric field, diffused onto a powder surface, and easily reacted with the purification gas. Therefore, high purification effect can be obtained in a short time. The impurity components are reacted with the purification gas, and removed to an external of the system as gaseous compound.

BRIEF EXPLANATION OF DRAWINGS

FIG. 1 is a schematic view illustrating a purification apparatus of the present invention.

DETAILED DESCRIPTION OF THE PREFERRED EMBODIMENT

Hereinafter, the present invention will be described particularly with examples.

The purification method of the present invention is characterized by: making a silica powder into a fluid state; contacting a purified gas to the silica powder in the fluid state at high temperature; and removing impurity components of the silica powder, where the silica powder in the fluid state is positioned in a magnetic field region and contacted with the purified gas, while applying voltage to the silica powder by an electric field which is generated by moving the silica powder.

Preferably, the purification method of the present invention is characterized by: making a silica powder into a fluid state; contacting a purified gas to the silica powder in the fluid state at high temperature; and removing impurity components of the silica powder, where the silica powder in the fluid state is positioned in a magnetic field region of 10 gausses or more, and contacted with the purified gas at a temperature of 1000° C. or more.

In the purification method of the present invention, the silica powder in a fluid state is positioned in the magnetic field region. The silica powder in the fluid state positioned in the magnetic field region generates the electric field based on the Fleming's rule by moving the powder, and voltage is applied to the silica powder. Thereby, the ionic impurity components in the silica powder are induced by the electric field, and diffused onto the powder surface. Therefore, the impurity components are easily reacted with the purification gas so that the high purification effect can be obtained in a short time.

In order to freely move the silica powder in the magnetic field region, the silica powder in the magnetic field region is kept in a fluid state. In addition, the fluid state of the present invention includes not only a state for generating convection but also a state including a floating state in which the silica powder can be freely moved.

The intensity of the magnetic field is suitably 10 gausses or more. If the intensity of the magnetic field is less than 10 gausses, the effect for accelerating diffusing of the impurity components is low, and the purification effect is not increased sufficiently. More preferably, the intensity of the magnetic field is 10 gausses or more to 150 gausses or less. The good effect for refining can be obtained in this range.

Further, a reaction temperature at the time of contacting the fluidized silica powder to the purified gas is preferably from 1000° C. or more to 1300° C. or less. If the reaction temperature is less than 1000° C., the impurity components contained in the silica powder is not ionic-moved, so that the diffusing speed of the impurity components to the powder surface is hardly increased. If the reaction temperature is more than 1300° C., the production cost becomes high since carrying out at the high temperature. In the purification method of the present invention, the excellent purification effect can be obtained at the temperature of about 1200° C.

In order to diffuse and move the impurity components contained in the silica powder onto the powder surface, it is necessary to fluidize the silica powder and position in the magnetic field. In order to fluidize the silica powder and position in the magnetic field, for example, a silica powder is filled in a fluidized bed having a magnetic field forming means, and air or inert gas is blown into the fluidized bed so as to fluidize the silica powder, and thereby, the magnetic field is formed in the fluidized bed. Further, when a cyclone-shaped container having a magnetic field forming means is used, a silica powder is blown into the container together with air or inert gas so as to fluidize the silica powder, and the magnetic field can be applied. In addition, the purification gas can be used for fluidizing the silica powder.

As for the purification gas, a gas enables to gasify the impurity components when reacting on the powder surface is used. More particularly, for example, halogen gas such as gaseous chlorine or the like, and hydrogen halide gas such as hydrogen chloride gas or the like can be used. The purification gas is introduced into the silica powder fluidized in the magnetic field, or the silica powder is fluidized in the magnetic field by the purification gas. Thereby, diffusing of the impurity components contained in the silica powder is accelerated so as to move the impurity components onto the powder surface. As a result of this, the impurity components are contacted and reacted with the purification gas on the powder surface so as to become a chloride gas and the like and removed.

According to the purification method of the present invention, a purified silica powder having remarkable few impurity components can be obtained by the purification in a short time. Among the impurity components, an alkali impurity component has the highest purification effect since being very often ionic-moved at a high temperature. Especially, it is excellently effective to remove Li which has a high ionicity.

When the purification method of the present invention is carried out, for example, the following purification apparatus can be used, that is, a purification apparatus including: a fluidized bed for fluidizing the silica powder, or a reaction container for receiving the fluidized silica powder; a means for introducing a purified gas into the fluidized bed or the reaction container; a means for heating in the fluidized bed or the reaction container at from 1000° C. to 1300° C.; and a means for forming a magnetic field of 10 gausses or more in the fluidized bed or the reaction container.

As the apparatus in the present invention, the fluidized bed may possess a function of the reaction container. For example, vertical and cylindrical type fluidized bed is used, a lower part of fluidized bed is divided by a floor plate having many air hole, the silica powder is filled on the upper side of the floor plate, the purification gas in-let port is provided at the lower side of the floor plate, and the gas out-let port is provided on the upper side of the fluidized bed. On the other hand, the heater is provided on the outer periphery of the fluidized bed and the means for forming the magnetic field is provided on an outside of the heater. The silica powder in the fluidized bed is made to be fluidizing state by the purification gas and the inside of the fluidized bed is heated from 1000° C.

or more to 1300° C. or less and the magnetic field is formed 10 Gausses or more by the means for forming the magnetic field. Then, the impurity in the silica powder is reacted with the purification gas so as to be vaporized. The generated gases by the reaction are exhausted from the fluidized bed with the un-reacted purification gas.

In addition, before introducing the purification gas, the following gas flow is possible. That is, air is introduced with silica powder beforehand through the purification gas in-let port so as to fluidize the silica powder, and thereafter, the purification gas is introduced in the fluidized bed instead of air, or the purification gas is introduced with air in the fluidized bed.

As for the reaction conditions, for example, the 1% to 15% concentration of purification gas can be contacted with the silica powder at 1000° C. to 1300° C. for 60 min. to 90 min.

Further, the cyclone-shaped container can be used instead of the above-described apparatus. In the container, the temperature is set to 1000° C. to 1300° C., and a magnetic field of 10 gausses or more is formed in a region including the inside of the container. Silica powder is introduced into the container together with air so as to fluidize the silica powder. After that, the purification gas is blown into the container so as to react to the impurity components of the silica powder. The generated gases by the reaction are exhausted from the reaction container together with un-reacted purification gas.

An example of an apparatus for carrying out the purification method of the present invention is illustrated in FIG. 1. As illustrated in FIG. 1, a purification apparatus 10 includes a vertical and cylindrical fluidized bed 11, and a heater 12 surrounding the fluidized bed 11. Further, a pair of magnets 13 is provided on both sides of the fluidized bed 11 including the heater 12. The fluidized bed 11 is formed by a quartz tube, and includes an inducing port for the purification gas at a bottom part thereof, and an exhaust port at an upper part thereof. Further, the fluidized bed 11 includes a bottom plate 14 inside thereof, and many vent holes are provided at the bottom plate 14.

When the purification gas is introduced from the bottom part of the fluidized bed 11, the gas flows toward the upper part of the fluidized bed 11 through the vent holes of the bottom plate 14 so as to fluidize a silica powder 15 stored on the upper side of the bottom plate 14, and then, exhausted from the exhaust port at the upper part of the fluidized bed. On the other hand, the inside of the fluidized bed is heated at about 1200° C. by the heater 12, and the magnetic field of 10 gausses or more is formed in the fluidized bed by the magnets 13.

As for the silica powder kept to have the fluidized state by the purification gas, the silica powder is moved in the magnetic field of 10 gausses or more so as to generate an electric field, so that voltage is applied to the silica powder. Thereby, ionic impurity components in the silica powder, for example, lithium ion or the like are induced onto the powder surface by the electric field, and contacted and reacted with the purification gas at a high temperature of about 1200° C. so as to form chloride to be gasified. The gasified chloride is removed from the silica powder.

EXAMPLE

A silica powder was subjected to a purification treatment by the steps of taking 20 kg silica powder having an average powder diameter of 220 μm into a quartz reaction container having an inner diameter of φ250 mm; forming a fluid layer using air as carrier gas; forming a magnetic field in a fluid region; and inducing purification gas into the container at a high temperature (Example). In addition, a silica powder was subjected to the purification treatment by inducing the purification gas without forming the magnetic field in the fluid region (Comparison example). The effects by these treatments were shown in Table 1 in comparison. According to the example of the present invention, when the treatment time was 1 hour, each alkali metal content was 0.15 ppm or less, and partially 0.05 ppm or less. Especially, Li was largely removed. On the other hand, alkali metal contents of the comparison example were 0.3 ppm or more, and especially, Li was hardly removed.

TABLE 1

| | Purification Gas | | Treatment Temperature | Treatment Time | Magnetic Intensity (gauss) | Impurity Components (ppm) | | |
|---|---|---|---|---|---|---|---|---|
| | Kinds | Concentrations | | | | Na | K | Li |
| Before Treatment | — | — | — | — | — | 2.4 | 0.71 | 4.2 |
| Example 1 | $Cl_2$ | 2% | 1150° C. | 1 hour | 20 | 0.09 | 0.07 | 0.12 |
| Example 2 | $Cl_2$ | 0.5% | 1150° C. | 1 hour | 100 | 0.09 | 0.08 | 0.10 |
| Example 3 | $Cl_2$ | 5% | 1150° C. | 1 hour | 100 | 0.07 | 0.06 | 0.06 |
| Example 4 | HCl | 2% | 1150° C. | 1 hour | 100 | 0.04 | 0.06 | 0.06 |
| Example 5 | $Cl_2$ + HCl | 1 + 0.2% | 1150° C. | 1 hour | 100 | 0.04 | 0.04 | 0.04 |
| Example 6 | $Cl_2$ + HCl | 5 + 5% | 1150° C. | 1 hour | 100 | 0.05 | 0.05 | 0.04 |
| Example 7 | $Cl_2$ + HCl | 5 + 5% | 1150° C. | 1 hour | 100 | 0.02 | 0.04 | 0.05 |
| Example 8 | $Cl_2$ + HCl | 5 + 5% | 1260° C. | 1 hour | 50 | 0.01 | 0.03 | 0.02 |
| Comparison example 1 | $Cl_2$ | 5% | 1150° C. | 1 hour | No | 0.36 | 0.41 | 4.11 |
| Comparison example 2 | $Cl_2$ | 5 + 5% | 1150° C. | 1 hour | No | 0.33 | 0.30 | 4.06 |
| Comparison example 3 | $Cl_2$ + HCl | 20 + 60% | 1150° C. | 1 hour | No | 0.26 | 0.28 | 4.01 |

[Possibility of Application for Industry]

The treatment method of the present invention has high purification effect at a temperature of 1000° C. to 1300° C., which is lower than an average treatment temperature of the conventional gas purification methods. Thus, there is an advantageous that an energy cost is low. Further, if a halogen gas is used as the purification gas, there is no danger of explosion, so that an operation can be carried out safety.

The invention claimed is:
1. A purification apparatus of a silica powder comprising:
a fluidized bed configured to fluidize the silica powder, an inlet to introduce a purification gas into the fluidized bed;

a heater to heat the fluidized bed to a temperature of from 1000° C. to 1300° C.; and a pair of magnets provided outside of the heater and the fluidized bed, wherein a magnetic field of 10 gausses or more is applied to the fluidized bed by the pair of magnets and the fluidized bed is in the form of a quartz tube.

2. The purification apparatus according to claim 1 wherein the fluidized bed is a vertical and cylindrical fluidized bed, a lower part of the fluidized bed is divided by a floor plate having many air holes, the silica powder is filled on the upper side of the floor plate, the inlet to introduce the purification gas is provided at the lower side of the floor plate, and a gas outlet port is provided on the upper side of the fluidized bed;

wherein the heater is provided on an outer periphery of the fluidized bed;

wherein the silica powder in the fluidized bed is made to be in a fluidizing state by the purification gas; and wherein the inside of the fluidized bed is heated to a temperature of from 1000° C. or more to 1300° C. or less.

3. The purification apparatus according to claim 1, wherein the fluidized bed comprises a powder material that consists of the silica powder.

4. A silica powder purification apparatus, comprising:

a fluidized bed configured to fluidize a silica powder;

a purification gas device configured to introduce a purification gas into the fluidized bed;

a heating device configured to heat the fluidized bed to a temperature of from 1,000° C. to 1,300° C.; and a pair of magnets provided outside of the heater and the fluidized bed;

wherein a magnetic field of 10 Gauss or more is applied to the fluidized bed by the pair of magnets and the fluidized bed is in the form of a quartz tube.

5. The silica powder purification apparatus according to claim 4, wherein the fluidized bed contains a powder material that consists of the silica powder.

* * * * *